United States Patent
Leshem

(10) Patent No.: US 7,257,229 B1
(45) Date of Patent: Aug. 14, 2007

(54) APPARATUS AND METHOD FOR KEY SCHEDULING

(75) Inventor: Ziv Leshem, Kfar Yona (IL)

(73) Assignee: Winbond Electronics Corporation (TW)

(*) Notice: Subject to any disclaimer, the term of this patent is extended or adjusted under 35 U.S.C. 154(b) by 526 days.

(21) Appl. No.: 10/164,846

(22) Filed: Jun. 7, 2002

(51) Int. Cl.
*H04L 9/00* (2006.01)

(52) U.S. Cl. .................. 380/277; 380/29; 380/37

(58) Field of Classification Search .......... 380/277, 380/37, 29
See application file for complete search history.

(56) References Cited

U.S. PATENT DOCUMENTS

| | | | |
|---|---|---|---|
| 6,819,764 B1* | 11/2004 | Shimizu et al. | 380/37 |
| 6,931,127 B2* | 8/2005 | Lim | 380/37 |
| 6,937,727 B2* | 8/2005 | Yup et al. | 380/37 |
| 2002/0097868 A1* | 7/2002 | Watanabe et al. | 380/46 |
| 2003/0053623 A1* | 3/2003 | McCanny et al. | 380/37 |
| 2003/0068036 A1* | 4/2003 | Macchetti et al. | 380/29 |
| 2003/0099352 A1* | 5/2003 | Lu et al. | 380/37 |
| 2003/0198345 A1* | 10/2003 | Van Buer | 380/43 |
| 2003/0202658 A1* | 10/2003 | Verbauwhede | 380/43 |

* cited by examiner

*Primary Examiner*—Emmanuel L. Moise
*Assistant Examiner*—Techane J. Gergiso

(57) ABSTRACT

A key scheduler for encryption/decryption produces a new ciphering key by a key expansion process or recovers a previous ciphering key by an inverse expansion process. The key scheduler includes a set of adders and transformation circuitry. Each of adders receives a portion of a round key value as its first input. Some of the adders receive either a portion of the round key value or the output of some of the adders, as its second input, be control of arbitration devices. One adder receives as its second input an output from the transformation circuitry, which output is selected by an arbitration device from either a portion of the round key value or an output of an adder. The selection done by the arbitration devices depending on whether the process desired is the key expansion or inverse expansion.

20 Claims, 3 Drawing Sheets

APPARATUS AND METHOD FOR KEY SCHEDULING

TECHNICAL FIELD OF THE INVENTION

The present invention relates to the field of key scheduling for symmetric key block ciphers. More particularly, the invention relates to a Rijndael key scheduler.

BACKGROUND OF THE INVENTION

The Rijndael block cipher is a symmetric cryptographic algorithm, based on the use of simple byte operations, that was designed as a candidate for the Advanced Encryption Standard (AES). The National Institute of Standards and Technology (NIST) approved a Rijndael standard as the AES, as specified in the Federal Information Processing Standard (FIPS), FIPS-197. This standard specifies a symmetric encryption algorithm (hereinafter referred to as "the AES algorithm") that may be used to protect electronic data.

In the following description, the use of the terms transformation, bit, block, byte, cipher key, key expansion, round key, state, and word, is as defined in the AES algorithm standard, FIPS-197.

The AES algorithm can be used to encrypt/decrypt information utilizing cryptographic keys of 128, 192, or 256 bits and data blocks of 128 bits. In general, the encryption includes processing of an input data block a predetermined number of rounds. The number of rounds required is determined according to the size of key length used.

FIG. 1A is a flow chart illustrating the AES ciphering process of a data block D (plaintext) with a ciphering key K, which are being loaded in step 100. The number of rounds N is determined according to the key length (e.g., for a 128 bits key, N=10). The process begins with the so-called Add Round Key transformation 101, in which the state D is set to equal the addition of the ciphering key K=$K_0$ and the input data block (D). Rounds 1 to N−1 (steps 101, 102, and 105) are performed as long as the condition set in step 102 is not fulfilled.

Each round begins in Add Round Key transformation 101 of the state D which is performed with a corresponding Round Key $K_i$ (i=1, 2, . . . , N−1). The Add Round Key transformation is followed by a sequence of transformations 105 which are applied to the state D, and which are not of particular interest in this invention, and thus are not discussed herein in detail for the sake of brevity.

If the condition in step 102 is satisfied, an additional set of transformations 106 of the state D are performed, followed by another Add Round Key transformation 109, in which the last Round Key $K_N$ is used. The process is then terminated by outputting the Block Cipher obtained in the state D' (ciphertext). As will be explained hereinafter, each Round Key is recursively computed utilizing the value of the previous key, i.e., $K_i=f(K_{i-1})$. This computation (not shown in FIG. 1A) is also known as the key expansion process.

Similarly, during the decryption, as shown in the flow chart in FIG. 1B, the same number of rounds is used in the deciphering process utilizing the inverse transformations. A Cipher Block (D') (ciphertext) and the last Round Key $K_N$ that was used in the ciphering, are input in step 110. The first transformation in step 111 is an Add Round Key, in which the state D' is set according to the value of the last Round Key $K_N$. The decryption, also termed herein as the inverse cipher, comprises a sequence of inverse transformations 111, and 115. The respective Add Round Key transformation performed in step 111 in each round uses an inverse key expansion process to derive the corresponding Round Key $K_{i-1}=f^{-1}(K_i)$ (i=9, 8, . . . 2).

Once the condition in step 112 is satisfied, the inverse transformations of the state 116 are performed, and in step 114, the final Add Round Key transformation is carried out to recover the plaintext D, by utilizing the first Round Key $K_0$.

As shown in FIGS. 1A and 1B, the AES algorithm requires a consecutive process of recursive key expansion processes to take place for a proper block ciphering and deciphering. While in the block ciphering the process is initiated with the original secret key K and proceeds "forward" utilizing new keys obtained via the key expansion process, during the block deciphering the key expansion is performed "backwards". Namely, the first key used for block deciphering is the one that was obtained in the last key expansion of the block ciphering process $K_N$, and each successive Round Key is then obtained by an inverse key expansion process which recovers the previous Round Keys of the block ciphering process.

This key scheduling imposes several restrictions on AES implementations, particularly on hardware implementations. The recursive nature of the key scheduling requires a number of key expansions in order to obtain a specific Round Key. One common solution is to store the Round Keys in a memory device (AES/Rijndael Core, SecuCore 2001) and for each cipher/decipher round, fetching the corresponding Round Key from the memory device. This solution enables managing the key scheduling conveniently, but it is, however, considered costly in hardware terms and processing time due to the silicon area needed for a memory device which should be provided in addition to a key expansion unit e.g., for 128-bits key a memory space of 128×11=1408 bits of memory are required, and due to CPU time required to fetch the stored keys.

Another possible way to address the key scheduling problem is to provide a key expansion module for the block ciphering process, and an inverse key expansion module to be used in the block deciphering process ("*Implementation of the block cipher Rijndael using Altera FPGA*", P. Mroczkowski). Although in such implementations, a memory device for storing only a single key is required (e.g., 128 bits of memory in order to produce the next/previous key) such implementations are still expensive due to the use of two different modules for key scheduling (gate count and die area), particularly in view of the great resemblance between the key expansion process, and its inverse implementation, which will be discussed in detail hereinafter.

All the methods described above have not yet provided satisfactory solutions to the problems involved in hardware implementations of Rijndael block ciphering/deciphering key scheduling.

Accordingly, there exists a need for a key scheduler capable of performing key expansion for the block ciphering and deciphering processes and/or a key scheduler implementation with a minimal gate count.

SUMMARY OF THE INVENTION

In accordance with one aspect of the present invention, there is provided a key scheduler capable of producing a new ciphering key by a key expansion process or recovering the previous ciphering key by an inverse expansion process utilizing an input of a Round key value. The key scheduler includes a set of adders, each of which receives a portion of the Round key value as its first input; transformation circuitry for producing reversible digital transformation of a Round key portion provided as an input of the transformation circuitry, the output of the transformation circuitry being provided to one of the adders as its second input; and a first set of arbitration devices, each of which selects between a first input being the corresponding Round key portion input of one of the adders, and a second input being an output of the one of the adders, and wherein the output of one of the arbitration devices selects the input to the transformation circuitry, and the output of each of the remaining arbitration devices selects the second input value of the second input of each of the adders.

In accordance with another aspect of the invention, there is provided a method for producing a new ciphering key by a key expansion process or recovering a previous ciphering key by an inverse expansion process. A first Round key value is input to an adder, the adder having a first portion and a second portion. A first portion of the first round key value is input as a first input to a first arbitration device and a first portion of a second round key value is input as a second input to the first arbitration device. Either the first portion of the first round key value or the first portion of the second round key value is selected as the output of the first arbitration device depending on whether the desired process is the expansion process or the inverse expansion process. The output of the first arbitration device is transformed to produce a transformed output and the transformed output is input as a second input to the first portion of the adder. A second portion of the first round key value is received as a first input to a second arbitration device and a second portion of a second round key value is received as a second input to the second arbitration device. The second arbitration device selects either the second portion of the first round key value or the second portion of the second round key value as the output of the second arbitration device depending on whether the desired process is the expansion process or the inverse expansion process. The output of the second arbitration device are provided as the second inputs to the second portion of the adder. The adder outputs the second round key value.

In another aspect of the present invention, there is provided a communications device operable for communicating with a network, the device includes a key scheduler in accordance with the present invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

The following terms are defined as follows:

stretched key—a new key obtained utilizing the key expansion process, or by utilizing the inverse key expansion process.

"backwards"—when a key is stretched to obtain a previous Round Key, i.e., $K_{i-1}=f(K_i)$.

"forwards"—when a key is stretched to obtain the next Round Key, i.e., $K_{i+1}=f(K_i)$.

The AES algorithm consists of a predetermined number of rounds, each of which requires a unique Round key. In this process the actual key is "stretched" and transformed to yield a plurality of Round keys which are required for the block ciphering/deciphering processes in each round.

Figure 1A:
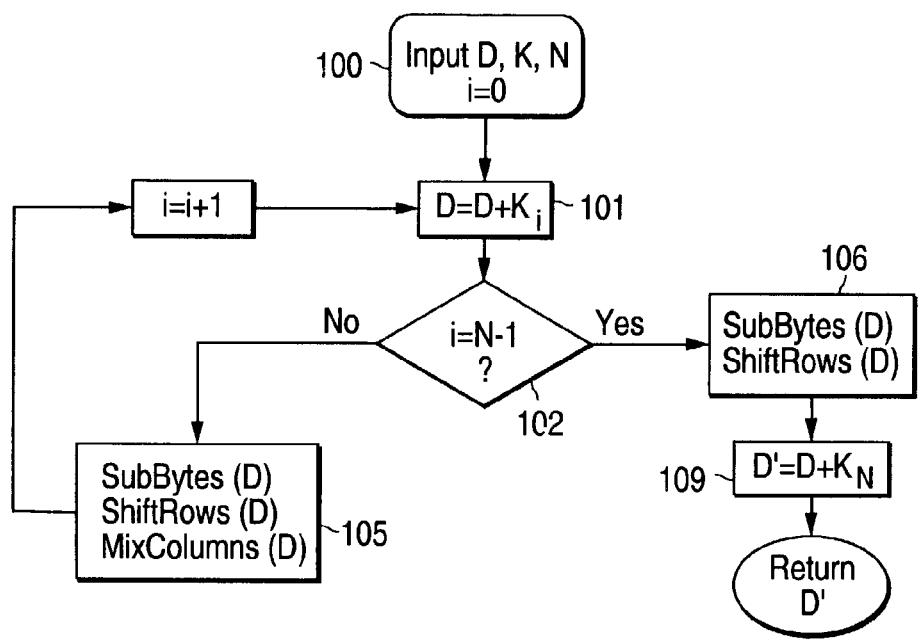
FIGS. 1A and 1B are flow charts illustrating the AES block ciphering and deciphering processes, respectively.
Figure 1B:
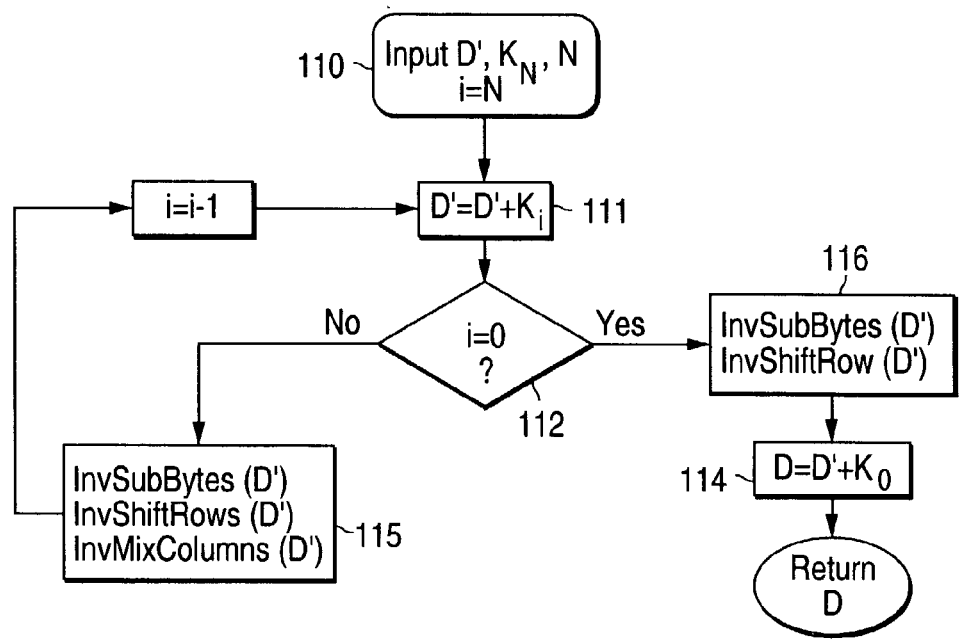
Figure 2A:
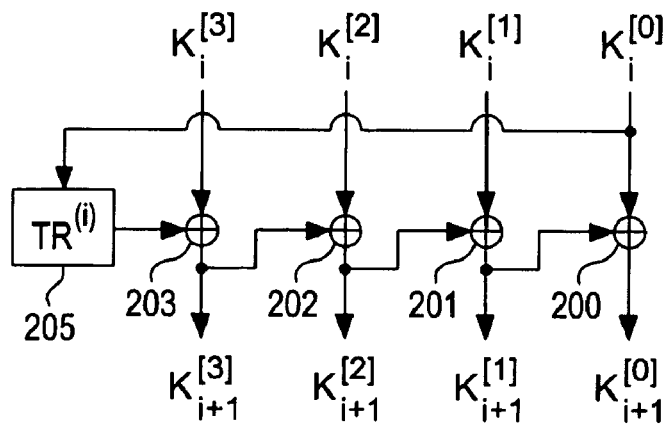
FIGS. 2A and 2B are block diagrams illustrating conventional key scheduler modules for the key expansion process and for its inverse process, respectively.

The Round keys generation process is known as key expansion. FIG. 2A is a block diagram illustrating a conventional Key expansion operation as known in the art. The new Round key $K_{i+1}$ is computed from the four 32-bit portions of the previous Round key $K_i$, wherein the key portions $K_i^{[j]}$ (i=0, 1,2,3) are used to compute the four key portions of the new Round key $K_{i+1}^{[j]}$ (j=0, 1,2,3) utilizing a set of adders 200–203 and a transformation block 205 ($TR^{(i)}$).

Figure 2B:
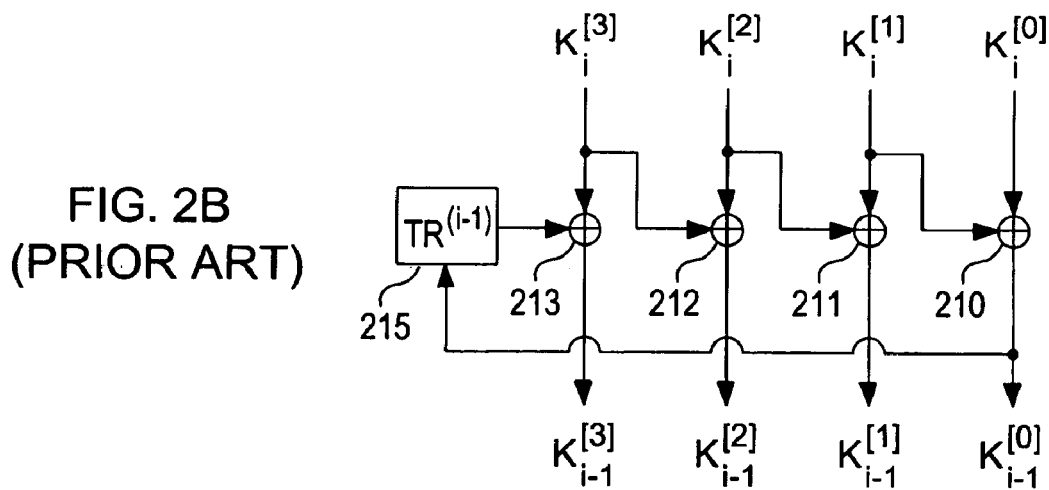

The adders 200–203 are modulus 2 adders, and the transformation block performs the $TR^{(i)}$ transformation utilizing the functions and transformations SubByte, RotByte, and Rcon[i], as described in the FIPS-197 standard. The operation performed by the $TR^{(i)}$ transformation depends on the round number i due to the Rcon[i] function. The computations which are actually performed during the Key expansion process are: $K_{i+1}^{[3]}=K_i^{[3]} \oplus TR^{(i)}(K_i^{[0]})$, and $K_{i+1}^{[j]}=K_i^{[j]} \oplus K_{i+1}^{[j+1]}$ (j=2, 1, 0). Therefore, in the inverse operation required for recovering the previous Round key during block deciphering, the following computations should be performed: $K_{i-1}^{[j]}=K_i^{[j]} \oplus K_i^{[j+1]}$ (j=0, 1, 2), and $K_{i-1}^{[3]}=TR^{(i-1)}(K_{i-1}^{[0]}) \oplus K_i^{[3]}$, as illustrated in FIG. 2B. Thus, the inverse Key expansion process requires another set of adders 210–213, and usually an additional transformation block $TR^{(i-1)}$ 215.

It is therefore common in hardware implementations to have two key schedulers, one for the block ciphering process (as shown in FIG. 2A), and another one for the deciphering process (as shown in FIG. 2B). Consequently, the number of XOR gates required to implement the adders 200–203 and 210–213 in such designs is 2×4×32=256, and an addition of about 2×2Kgates=4Kgates (each SubByte requires about 0.5

Kgates and there are 4 SB modules in each TR block) to implement the transformation blocks, 205 and 215.

Figure 3:
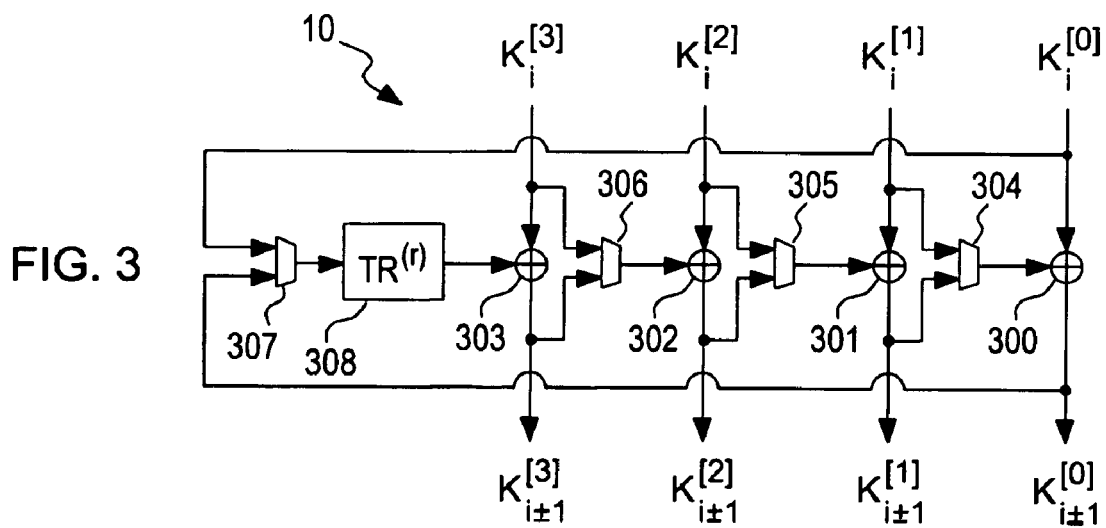
FIG. 3 is a block diagram illustrating one embodiment of a key scheduler in accordance with the present invention.

With reference to FIG. 3, there is shown one embodiment of a key scheduler 10 in accordance with the present invention. The cipher/decipher processes are performed utilizing the single key scheduler 10 utilizing four 32-bit adders 300–303 and four arbitration devices 304–307 (not including the gate count required to implement the TR transformation block). The arbitration devices 304–307 function to select a certain signal path or node to be interconnected. In one embodiment, the adders 300–303 and arbitration devices 304–307 are implemented using bit-wise XOR gates and mulitplexers, respectively. If implemented in this fashion, 128 XOR gates and 128 mulitplexers are utilized to realize the 32-bit adders 300–303 and arbitration devices 304–307. In such implementation, the gate count is substantially reduced, and consequently less die area is required. As will be appreciated, any implementation available to those skilled in the art may be used to realize the adders 300–303 and arbitration devices 304–307.

Figure 4:
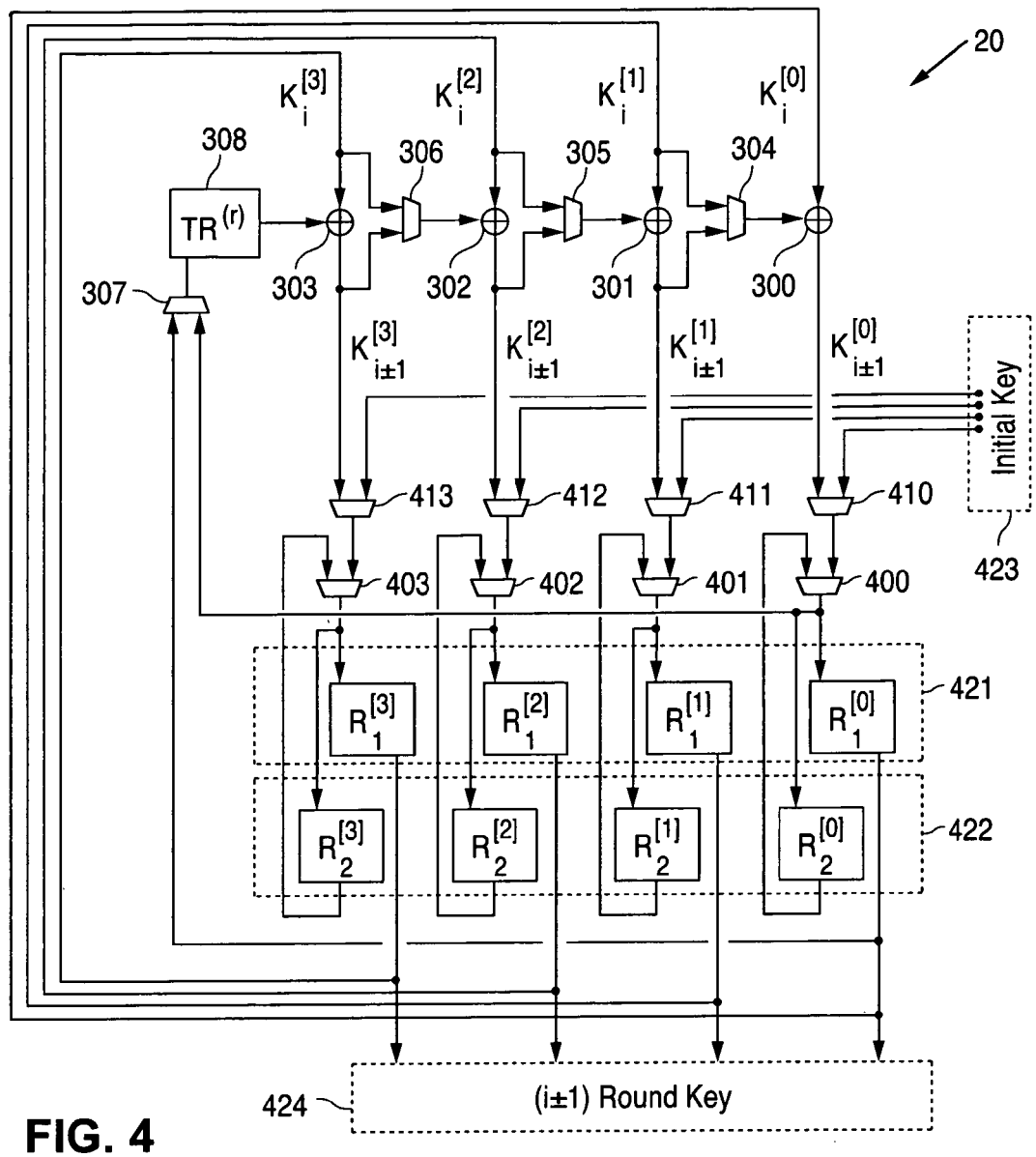
FIG. 4 is a block diagram illustrating another embodiment of a key scheduler in accordance with the present invention.

With reference to FIG. 4, there is shown another embodiment of a key scheduler 20 in accordance with the present invention. The key scheduler 20 includes the adders 300–303 and the arbitration devices 304–307. The key scheduler 20 also includes registers 421, 422 and arbitration devices 400–403 and 410–413. The key scheduler 20 provides additional functionality, as will be described below.

According to the present invention, the number of gates required to implement the Key scheduler 10, 20 for the block ciphering and its inverse process is substantially reduced from that required in the conventional designs. The key scheduler 10, 20 is capable of carrying out the Key expansion in both directions, namely to compute a new Round key $K_{i+1}$ or the previous Round key $K_{i-1}$ according to an input Round key $K_i$ and a control signal (not shown) which is utilized to determine the direction of the Key expansion that is to be performed.

The key scheduler 10 of the present invention provides a set of adders 300–303 and a single transformation block $TR^{(r)}$ 308 to compute successive Round keys for the ciphering and deciphering processes. The arbitration devices 304–307 are used to select an active input to the adders 300–302 and the transformation block 308, respectively.

When the key expansion is required to compute a new Round key $K_{i+1}$, a control signal provided to the arbitration devices 304–307 is set to select the respective input values of $K_{i+1}^{[1]}$, $K_{i+1}^{[2]}$, $K_{i+1}^{[3]}$, and $K_i^{[0]}$, to be provided to the adders 300–302 and the transformation block 308. In the inverse process, when the computation of the previous Round key $K_{i-1}$ is required, the control signal is accordingly set to select the input values of $K_i^{[1]}$, $K_i^{[2]}$, $K_i^{[3]}$, and $K_{i-1}^{[0]}$, which should be delivered to the adders 300–302 and to the transformation block 308. The operation of the transformation block $TR^{(r)}$ is also set accordingly to allow forward key expansion (r=i) to obtain a new Round key $K_{i+1}$, and to recover a previous Round key $K_{i-1}$ (r=i−1) in the backwards key expansion process.

The architecture shown in FIG. 3 may be modified to provide the key scheduler 20 as shown in FIG. 4. The arbitration devices 410–413 are used to select a key value, an initial key 423 or the stretched key $K_{1\pm i}$, to be stored in the register 421. Each arbitration device 410–413 is used to select a respective 32-bit key portion, $K_{i\pm 1}^{[j]}$ or $K^{[j]}$ (j=0, ..., 3) 423, to be respectively stored in a cell $R_i^{[j]}$ (j=0, ..., 3) of the register 421. In this way, a control signal (not shown) is used to select which key is loaded into register 421.

More particularly, for the first ciphering/deciphering round, the Initial Key 423 is loaded via one input of the arbitration devices 410–413, and for the following rounds the stretched key $K_{1\pm i}$, of the previous round is selected. The key value stored in the register 421, $R_i^{[j]}$ (j=0, ..., 3) is also provided via an output 424, and also introduced on the $K_i^{[j]}$ (j=0, 1, 2, 3) lines into an input of the adders 300–303.

In general, for the block ciphering process, the Initial Key 423 obtained from the key input via the arbitration devices 410–413 will be the secret key K ($K_0$). In one embodiment, for deciphering, one may utilize an external memory (not shown) to store the stretched key obtained in the last ciphering round $K_N$, which will then be used as the Initial Key in an inverse Key expansion process. If however, such an external memory is not available, or if the required last ciphering round key $K_N$ was not previously computed, then the Initial Key 423 loaded will be the secret key K ($K_0$), which will then be stretched over N key expansion processes to obtain the last ciphering round key $K_N$, which is required to initiate the deciphering process. It should be noted that the last ciphering Round Key $K_N$ may be used to initiate the deciphering process if the current block being deciphered was ciphered using the same original secret key K ($K_0$), that was used to produce the last ciphering Round Key $K_N$.

To avoid such scenarios, the register 422 may optionally be utilized in the key scheduler 20 of the present invention. The register 422 may be used to store stretched keys which were obtained over a full (or partial) N rounds expansion process. Thus, whenever a deciphering process is engaged, the initiating key $K_N$ may be obtained from the internal register 422, via the four arbitration devices 400–403. The arbitration devices 400–403 are utilized to select which key is to be stored in the Round Key register 421, $R_2^{[j]}$ (j=0, 1, 2, 3). It should be noted that the arbitration devices 400–403 are optional, and in fact, may not be necessary in other possible embodiments of the invention in which the additional register 422 is absent.

The key values provided on the input of the Round key register 421 are also provided to the input of the additional key register 422. Thus, with a proper control, a signal can be provided to latch the desired Round key in the additional key register 422, and the stored Round key value can be loaded whenever required, by the use of another control signal, into the Round key register 421, via the arbitration devices 400–403.

Figure 5:
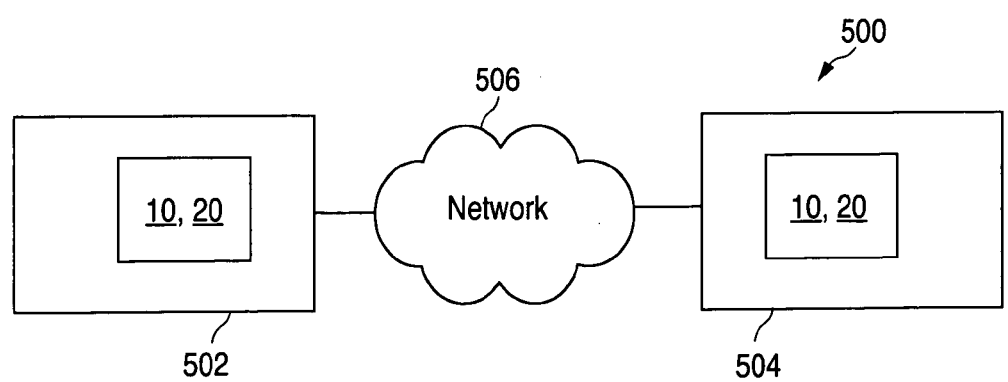
FIG. 5 is a block diagram of a communication system utilizing a key scheduler in accordance with the present invention.

Now referring to FIG. 5, there is shown a block diagram of a communication system 500 in accordance with the present invention. The communication system 500 includes a communications device 502 having the key scheduler 10, 20 and a communications device 504 having the key scheduler 10, 20, in accordance with the present invention.

The communication devices 502, 504 are coupled to a network 506 and are operable for communication (transmitting/receiving) data to/from, and across, the network 506. As will be appreciated, the network 506 is a LAN, WAN, private network, intranet, internet or some other telecommunication network, or network capable of communicating data from one point to another point.

The above examples and description have of course been provided only for the purpose of illustration, and are not intended to limit the invention in any way. As will be appreciated by the skilled person, the invention can be carried out in a great variety of ways, employing techniques different from those described above, all without exceeding the scope of the invention.

What is claimed is:

1. A key scheduler for at least one of 1) producing a new ciphering key by a key expansion process and 2) recovering a previous ciphering key by an inverse expansion process utilizing a round key value, the scheduler comprising:
    a set of adders, each adder receiving a first input comprising a portion of the round key value and a second input;
    transformation circuitry for producing reversible digital transformation of an input of the transformation circuitry, an output of the transformation circuitry provided to one of the adders as its second input; and
    a first set of arbitration devices, each of which selects between a first input comprising the portion of the round key value received by a particular one of the adders and a second input comprising an output of the particular one of the adders, wherein an output of one of the arbitration devices provides the input to the transformation circuitry, and an output of each remaining arbitration device provides the second input of one of the adders.

2. The key scheduler in accordance with claim 1 wherein the output of one of the arbitration devices comprises least significant bits of the round key value and is provided as the input of the transformation circuitry, and the output of the transformation circuitry is provided as the second input of the adder which receives most significant bits of the round key value as its first input.

3. The key scheduler in accordance with claim 2, wherein the outputs of the first set of arbitration devices, except for the arbitration device receiving the least significant bits of the round key value, are provided as the second inputs of the adders, except for the adder receiving the most significant bits of the round key value.

4. The key scheduler in accordance with claim 1 further comprising a first storage device having a plurality of cells, each of the plurality of cells capable of storing an input comprising the output of one of the adders and capable of providing an output comprising the first input of that adder, wherein the input and output of the cell comprising least significant bits of the round key value are provided as the inputs to the arbitration device that provides the input to the transformation circuitry.

5. The key scheduler in accordance with claim 4 further comprising a second set of arbitration devices for selecting the inputs to be stored in the first storage device, the second set of arbitration devices receiving at one input portions of an external round key value and at another input the outputs of the adders.

6. The key scheduler in accordance with claim 5 further comprising:
    a second storage device for storing a selected round key value, the second storage device comprising a plurality of cells each capable of storing a round key portion obtained from a corresponding cell of the first storage device and capable of providing the round key portion as input to the corresponding cell of the first storage device; and
    a third set of arbitration devices for selecting the value to be stored in the first storage device, the third set of arbitration devices receiving at one input the corresponding outputs of the second set of arbitration devices and at another input the outputs of the cells of the second storage device.

7. The key scheduler in accordance with claim 1 wherein the key scheduler performs a Rijndael algorithm.

8. The key scheduler in accordance with claim 1 wherein the key scheduler performs an AES algorithm.

9. An apparatus for at least one of 1) producing a new ciphering key by a key expansion process and 2) recovering a previous ciphering key by an inverse expansion process, the apparatus comprising:
    a first arbitration device having a first input for receiving a first portion of a first key and having a second input for receiving a first portion of a second key, the first arbitration device selecting the first input or second input as an output of the first arbitration device in response to a control signal;
    a second arbitration device having a first input for receiving a second portion of the first key and having a second input for receiving a second portion of the second key, the second arbitration device selecting the first input or second input as an output of the second arbitration device in response to the control signal;
    a third arbitration device having a first input for receiving a third portion of the first key and having a second input for receiving a third portion of the second key, the third arbitration device selecting the first input or second input as an output of the third arbitration device in response to the control signal;
    a fourth arbitration device having a first input for receiving a fourth portion of the first key and having a second input for receiving a fourth portion of the second key, the fourth arbitration device selecting the first input or second input as an output of the fourth arbitration device in response to the control signal;
    a transformation circuit receiving the output of the first arbitration device and producing a transformed output;
    a first adder having a first input for receiving the first portion of the first key and a second input for receiving the output of the second arbitration device;
    a second adder having a first input for receiving the second portion of the first key and a second input for receiving the output of the third arbitration device;
    a third adder having a first input for receiving the third portion of the first key and a second input for receiving the output of the fourth arbitration device; and
    a fourth adder having a first input for receiving the fourth portion of the first key and a second input for receiving the transformed output of the transformation circuit;
    wherein each adder outputs a respective portion of the second key, and the control signal controls whether the adders produce the new ciphering key or recover the previous ciphering key.

10. The apparatus in accordance with claim 9 further comprising a first storage register for storing a stretched key.

11. The apparatus in accordance with claim 9 further comprising a plurality of additional arbitration devices for selecting an initial key or a stretched key for input to the first through fourth adders, the transformation circuit, and the first through fourth arbitration devices.

12. The apparatus in accordance with claim 9 wherein the apparatus performs a Rijndael algorithm.

13. The apparatus in accordance with claim 9 wherein the apparatus performs an AES algorithm.

14. A method for at least one of 1) producing a new ciphering key by a key expansion process and 2) recovering a previous ciphering key by an inverse expansion process, comprising:
    receiving a first round key value as a first input to a first portion and a second portion of an adder;

receiving a first portion of the first round key value as a first input to a first arbitration device and a first portion of a second round key value as a second input to the first arbitration device;

selecting the first portion of the first round key value or the first portion of the second round key value as an output of the first arbitration device depending on whether a desired process is the expansion process or the inverse expansion process;

transforming the output of the first arbitration device to produce a transformed output;

receiving the transformed output as a second input to the first portion of the adder;

receiving a second portion of the first round key value as a first input to a second arbitration device and a second portion of the second round key value as a second input to the second arbitration device;

selecting the second portion of the first round key value or the second portion of the second round key value as an output of the second arbitration device depending on whether the desired process is the expansion process or the inverse expansion process; and receiving the output of the second arbitration device as a second input to the second portion of the adder;

wherein the adder outputs the second round key value.

15. A method in accordance with claim 14 further comprising storing the first round key value in a register.

16. A method in accordance with claim 14 further comprising storing a stretched key value in a register.

17. A communications device operable for communicating with a network, the communications device comprising:
   a key scheduler capable of at least one of: producing a new ciphering key by a key expansion process and recovering a previous ciphering key by an inverse expansion process utilizing a round key value, the key scheduler comprising:
      a set of adders, each adder receiving a first input comprising a portion of the round key value and a second input,
      transformation circuitry for producing reversible digital transformation of an input of the transformation circuitry, an output of the transformation circuitry provided to one of the adders as its second input; and
      a first set of arbitration devices, each of which selects between a first input comprising the portion of the round key value received by a particular one of the adders and a second input comprising an output of the particular one of the adders, wherein an output of one of the arbitration devices provides the input to the transformation circuitry, and an output of each remaining arbitration device provides the second input of one of the adders.

18. The communications device of claim 17, wherein:
   the output of one of the arbitration devices comprises least significant bits of the round key value and is provided as the input of the transformation circuitry; and
   the output of the transformation circuitry is provided as the second input of the adder which receives most significant bits of the round key value as its first input.

19. The communications device of claim 18, wherein the outputs of the first set of arbitration devices, except for the arbitration device receiving the least significant bits of the round key value, are provided as the second inputs of the adders, except for the adder receiving the most significant bits of the round key value.

20. The communications device of claim 18, further comprising:
   a first storage device having a plurality of cells, each of the plurality of cells capable of storing an input comprising the output of one of the adders and capable of providing an output comprising the first input of that adder, wherein the input and output of the cell comprising least significant bits of the round key value are provided as the inputs to the arbitration device that provides the input to the transformation circuitry;
   a second set of arbitration devices for selecting the inputs to be stored in the first storage device, the second set of arbitration devices receiving at one input portions of an external round key value and at another input the outputs of the adders;
   a second storage device for storing a selected round key value, the second storage device comprising a plurality of cells each capable of storing a round key portion obtained from a corresponding cell of the first storage device and capable of providing the round key portion as input to the corresponding cell of the first storage device; and
   a third set of arbitration devices for selecting the value to be stored in the first storage device, the third set of arbitration devices receiving at one input the corresponding outputs of the second set of arbitration devices and at another input the outputs of the cells of the second storage device.

* * * * *